United States Patent [19]

Ziegler

[11] Patent Number: 4,563,678

[45] Date of Patent: Jan. 7, 1986

[54] LCD INDICATOR WITH BUILT-IN FIXED INFORMATION DISPLAY

[75] Inventor: Wolfgang Ziegler, Furth, Fed. Rep. of Germany

[73] Assignee: Robert Bosch GmbH, Stuttgart, Fed. Rep. of Germany

[21] Appl. No.: 486,684

[22] Filed: Apr. 20, 1983

[30] Foreign Application Priority Data

Apr. 22, 1982 [DE] Fed. Rep. of Germany ....... 3214988

[51] Int. Cl.$^4$ ............................................. G09G 3/36
[52] U.S. Cl. ............................... 340/765; 350/339 R; 350/344; 340/716
[58] Field of Search ............... 350/334, 335, 339 R, 350/343, 344, 339 F; 340/765, 784, 716, 763, 754

[56] References Cited

U.S. PATENT DOCUMENTS

| | | | |
|---|---|---|---|
| 4,165,157 | 8/1979 | Kobale et al. | 350/344 |
| 4,173,757 | 11/1979 | Hareng et al. | 340/765 |
| 4,227,777 | 10/1980 | Murakami | 350/339 F |
| 4,371,870 | 2/1983 | Biferno | 340/716 |
| 4,390,245 | 6/1983 | Shimizu et al. | 350/344 |

FOREIGN PATENT DOCUMENTS

2937304  4/1981  Fed. Rep. of Germany ...... 340/765

*Primary Examiner*—Gerald L. Brigance
*Attorney, Agent, or Firm*—Frishauf, Holtz, Goodman & Woodward

[57] ABSTRACT

In the assembly of a liquid crystal cell indicator of which the covering glass plates are sealed together by edge bonding provided by an adhesive appliqué, a fixed information display is provided by supplementary adhesive appliqués taking the place of some of the liquid crystal material inside the edge bonding perimeter. The display is optically inactive at the fixed information location, but the same appearance is provided as in the case of a display optically produced by electric signals. The fixed information is thus mechanically protected and is also visible when the electronic circuits are shut off.

5 Claims, 2 Drawing Figures

LCD INDICATOR WITH BUILT-IN FIXED INFORMATION DISPLAY

This invention concerns a liquid crystal display (LCD) indicator device in which a liquid crystal indicator material is enclosed between transparent or translucent plates on which conductive electrode layers are printed on the interior sides of the plates, as well as a layer for producing orientation of the crystal molecules, and polarizing layers are provided on the plates, usually on the outside. More particularly, the invention concerns such a device in which unchanging information or designations are also displayed.

LCD indicators are quite generally known and are used in a wide variety of mass-produced articles and equipment.

In known LCD indicators, fixed information is made visible by electrodes that are continuously turned on. This way of displaying fixed information has the disadvantage that the fixed information is not visible when the electronic circuits are turned off.

It is also known to provide the fixed information by screen printing, either on the front polarizer or on the rear polarizer of the device. This system has the disadvantage that the fixed information is not mechanically protected. It can easily be scratched so that the fixed information is either completely lost or its appearance becomes spoiled by scratches.

It is an object of the present invention to provide the fixed information where it is mechanically protected and in a manner that makes it visible when the electronic circuits related to the indicator are shut off.

Briefly, the fixed information is provided on adhesive appliqué patches provided between the plates of the indicator device within the space enclosed by the perimeter bonding appliqué. The appliqué patches bearing the fixed information are adhesively bonded by applying them to one of the plates before the plates are put together. The filling of the interior space with liquid crystal material and the pressing of the plates together are done only after the fixed information patches are put in place on one of the plates.

The invention has the advantage that the fixed information thus provided is visible even when the electronics of the device are shut off and is mechanically protected at all times. Furthermore, each appliqué patch bearing fixed information provides support for the liquid crystal material, particularly in large displays, so that support locations conventionally used in large displays can be dispensed with.

It is particularly useful to provide fibrous spacer material, such as chopped glass fibers, in the liquid crystal indicator material and/or the adhesive appliqué material. Thus, a constant layer thickness of the liquid crystal layer, as well as of the edge seal and of the appliqués, is provided. In this manner, even wide area crystal indicators can be manufactured with constant layer thickness.

In the manufacture of the LCD indicator device of the present invention, it is advantageous to apply the appliqué patches of a configuration for representing the fixed information in substantially the same stage in which the adhesive perimeter appliqué is put in place for the eventual edge bonding. This method leads more quickly and rapidly to the production of an indicator device well-suited for its purpose. It is also advantageous for the appliqué patch for the fixed information to be thinner than the appliqué for the edge bonding. In such a case the result is obtained that the appliqué patch for the fixed information dries more quickly than the appliqué for the perimeter bond. This has the advantage that smearing of the fixed information appliqué patch does not occur in putting together of the liquid crystal cells, because the edge bonding still has good adhesive properties because of its thicker body. Furthermore, it is possible to apply the adhesive patch for the fixed information before the appliqué for the edge bond. In that manner, the appliqué patch for fixed information is to a great extent solidified when the edge bond is produced. The putting together of the cells advantageously takes place when the appliqué patch for the fixed information is at least partly hardened. The adhesive is then still slightly deformable, so that an impermeable bonding of the adhesive between the two plates of the respective halves of the device is possible and, nevertheless, undesired spreading out of the adhesive does not take place.

THE DRAWINGS

The invention is further described by way of illustrative example, with reference to the annexed drawings, in which:

FIG. 1 is a schematic cross-section of an LCD indicator device in accordance with the invention, and FIG. 2 is an example of the display of a LCD indicator device including a display of fixed (permanent) information.

DESCRIPTION OF THE ILLUSTRATED EMBODIMENTS

Figure 1:
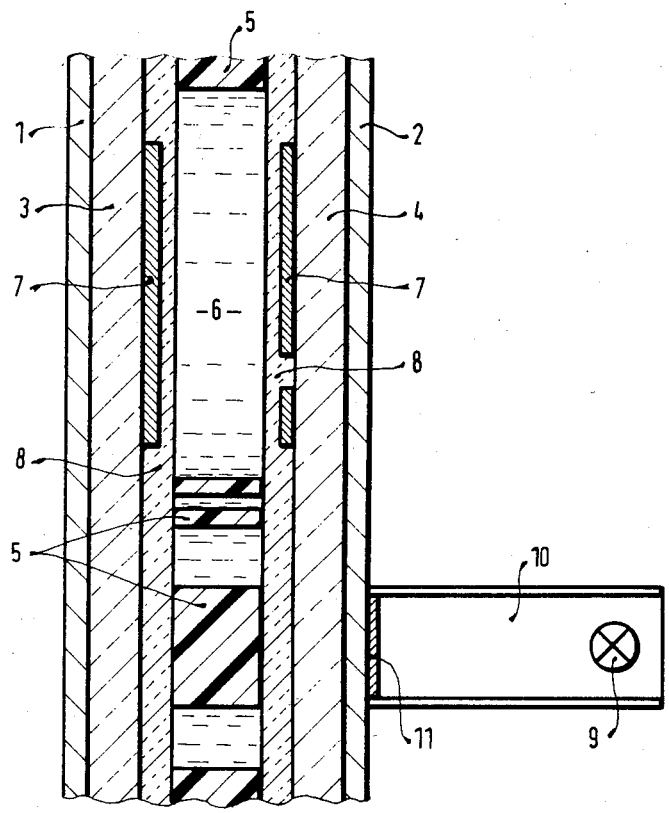

FIG. 1 shows an LCD display of the twisted mnematic type. These liquid crystal indicators consist of a front polarizer 1 and a rear polarizer 2. A front cover glass 3 follows the front polarizer 1 and a rear cover glass 4 is similarly just inside the rear polarizer 2. The cover glasses 3 and 4 are bonded together by adhesive appliqués 5.

Electrodes 7 of a transparent conducting material and an orientation layer 8 for the liquid crystal are located on the respective inner surfaces of the cover glasses 3 and 4. The liquid crystal 6 is embedded between the cover glasses 3 and 4 at front and back and the adhesive layer portions 5 around the edges. In order to provide a constant layer thickness of the liquid crystal layer, both the adhesive and the liquid crystal contain a so-called spacer material which consists, for example, of chopped glass fibers. The useful optical effect of an LCD indicator of this type consists in the rotation by 90° of the direction of polarization of the light passing through the liquid crystal layer 6, to the extent the molecular axes of the liquid crystals are not aligned by an electric field between the electrodes. When the polarizers 1 and 2 are aligned for parallel polarization, light symbols on a dark background are obtained, whereas in the case of crossed polarizers 1 and 2 the converse is obtained (dark symbols on bright background).

Before the assembly of the cell, in addition to the adhesive appliqué for the edge bonding there is applied during manufacture an adhesive appliqué 5 in the shape of the fixed information to be represented on the face of the indicator. When the cells are filled, there is no liquid crystal material at the places occupied by the adhesive appliqués. The display of these locations is optically inactive, so that the same effect is obtained for the display of permanent information as is produced optically in the case of a controlled element. The adhesive applique for representing fixed information is advantageously selected thinner than the edge bonding appliqué. It is also favorable in manufacture to put together the plates with the introduced liquid crystals after the appliqués for the fixed information are at least partially hardened. Since the edge layers are applied with greater thickness, the provision of a sufficiently tight bond by the edge layers is assured, while the appliqués for the fixed information are already hardened to a considerable extent, so that smearing of the fixed information in the pressing of the two plates together does not occur.

The fixed information inserted in the above-described fashion is mechanically protected against damage and is readable on the LCD indicator even when the electronics are switched off. More importantly, in the case of large displays, such an appliqué patch supports the liquid crystal layer, so that the otherwise used local supports can be dispensed with. This invention can be widely applied in order to make warning lamps 9 visible through the display by the use of a suitable light guide 10 behind the display in the case of displays with negative contrasts, i.e., bright symbols on dark background. For emphasis of the warning function, the element areas in question can be backed with colored imprints or films 11.

Figure 2:
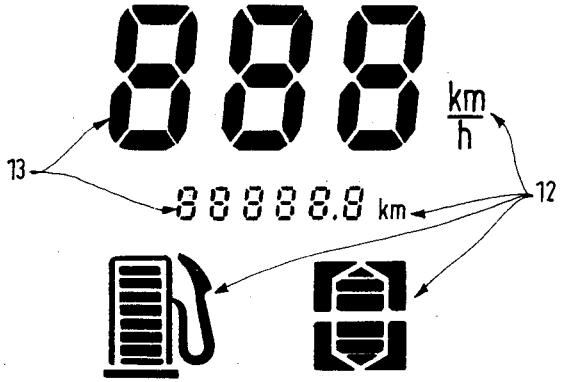

A front view of an LCD indicator device according to the invention is shown in FIG. 2. The fixed information is shown at 12 and the variable information at 13 in this figure. Whereas the variable information 13 is produced by the application of a voltage to the electrodes 7, the fixed information 12 is provided by an adhesive layer 5 which keeps the liquid crystal away from these locations.

Although the invention has been described with reference to a particular illustrative example, it will be understood that modifications and variations are possible within the inventive concept.

I claim:

1. Method of making an LCD indicator device in which front and back plates thereof are provided with conductive electrode layers, orienting layers and polarizer layers, followed by the application of an annular adhesive appliqué near enough to the perimeter of one of said plates for defining a perimetral bonding area for said plate, and sealing the plates together by said perimeter appliqué, as well as filling the space between said plates surrounded by said appliqué with liquid crystal indicator material, wherein prior to filling of the space surrounded by said perimeter appliqué with said liquid crystal indicator material and before the sealing of said plates together by said adhesive perimeter appliqué, there is performed the step of adhesively bonding to one of said plates at least one appliqué patch which is thinner than said perimeter appliqué and which bears fixed information for display of said information in said device, and wherein the sealing of the plates together produces enough spreading of said perimeter appliqué to assure a tight seal but by virtue of the lesser thickness of said appliqué patch does not smudge the information which said appliqué patch bears.

2. Method according to claim 1, in which the bonding of said appliqué patch to one of said plates is performed before the bonding of said perimeter appliqué to said plate.

3. Method according to claim 2, in which said appliqué patch is of a material that hardens after it is applied in place and in which said appliqué patch is allowed at least partly to harden before the step of sealing said plates together, for further avoidance of smudging of said information in the sealing step.

4. Method of making an LCD indicator device in which front and back plates thereof are provided with conductive electrode layers, orienting layers and polarizer layers, followed by the application of an annular adhesive appliqué near enough to the perimeter of one of said plates for defining a perimetral bonding area for said plate, and sealing the plates together by said perimeter appliqué, as well as filling the space between said plates surrounding by said appliqué with liquid crystal indicator material, wherein prior to filling up the space surrounded by said perimeter appliqué with said liquid crystal indicator material and before the sealing of said plates together by said adhesive perimeter appliqué, there is performed the step of adhesively bonding to one of said plates at least one appliqué patch which is of a material that hardens after it is applied in place and which bears fixed information for display of said information in said device, followed, before the step of sealing said plates together, by the step of allowing said appliqué patch to harden at least in part, for avoidance of smudging of said information in the sealing step.

5. Method according to claim 4, in which the bonding of said appliqué path to one of said plates is performed before the bonding of said perimeter appliqué to said plate.

* * * * *